(12) United States Patent
Lee et al.

(10) Patent No.: US 10,901,520 B1
(45) Date of Patent: Jan. 26, 2021

(54) CONTENT CAPTURE EXPERIENCES DRIVEN BY MULTI-MODAL USER INPUTS

(71) Applicant: Microsoft Technology Licensing, LLC, Redmond, WA (US)

(72) Inventors: Austin Seungmin Lee, Seattle, WA (US); Hauke Antony Gentzkow, Seattle, WA (US); Jonathan Reed Harris, Kirkland, WA (US); Alice Shirong Ferng, Bellevue, WA (US); Eddie Louis Mays, III, Maple Valley, WA (US); Lauren Diana Lo, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/675,077

(22) Filed: Nov. 5, 2019

(51) Int. Cl.
| | |
|---|---|
| G06F 3/01 | (2006.01) |
| G06F 3/16 | (2006.01) |
| G10L 15/22 | (2006.01) |
| G06F 1/16 | (2006.01) |
| G10L 15/26 | (2006.01) |

(52) U.S. Cl.
CPC ............ G06F 3/017 (2013.01); G06F 1/1694 (2013.01); G06F 3/167 (2013.01); G10L 15/22 (2013.01); G10L 15/26 (2013.01); *G10L 2015/223* (2013.01)

(58) Field of Classification Search
CPC ........ G06F 3/017; G06F 1/1694; G06F 3/167; G10L 15/26; G10L 2015/223; G10L 15/22
See application file for complete search history.

(56) References Cited

U.S. PATENT DOCUMENTS

| | | | |
|---|---|---|---|
| 9,031,847 B2 | 5/2015 | Sarin et al. | |
| 9,113,076 B2 | 8/2015 | King et al. | |
| 10,078,372 B2 | 9/2018 | Chen et al. | |
| 2010/0277579 A1 | 11/2010 | Cho et al. | |
| 2011/0301943 A1* | 12/2011 | Patch | G06F 3/167 |
| | | | 704/9 |
| 2012/0278074 A1 | 11/2012 | Burke et al. | |
| 2013/0053007 A1 | 2/2013 | Cosman et al. | |
| 2013/0144629 A1* | 6/2013 | Johnston | G06F 3/017 |
| | | | 704/275 |
| 2013/0204616 A1* | 8/2013 | Aoki | H04M 3/564 |
| | | | 704/226 |

(Continued)

OTHER PUBLICATIONS

Krum, et al., "Speech and Gesture Multimodal Control of a Whole Earth 3D Visualization Environment", In Proceedings of the symposium on Data Visualisation, May 27, 2002, pp. 195-200.

*Primary Examiner* — Muhammad N Edun (57) ABSTRACT

Systems, methods, and software are disclosed herein that relate to user input combined from spatial gestures and voice. A combined user input allows users to interact more fluidly with their surroundings when, for example, taking pictures, recording video, or controlling remote services or devices. In various implementations, one or more components of a computing device identify an occurrence of a combined user input such as a spoken utterance and a spatial gesture made with the device at least partially coincident with the spoken utterance. The one or more components identify a content capture experience associated with the combined user input and invoke the content capture experience on the device.

20 Claims, 6 Drawing Sheets

(56) References Cited

U.S. PATENT DOCUMENTS

2014/0320394 A1 10/2014 Costanzo et al.
2019/0013018 A1* 1/2019 Rekstad ................ G06F 3/16
2020/0219320 A1* 7/2020 Moniri ................ G06T 19/006

* cited by examiner

CONTENT CAPTURE EXPERIENCES DRIVEN BY MULTI-MODAL USER INPUTS

TECHNICAL FIELD

Aspects of the disclosure are related to the fields of computing devices and software applications, and in particular, to enhanced content capture experiences driven by multi-modal user inputs.

TECHNICAL BACKGROUND

Modern computing devices support a variety of user input modalities such as voice control and spatial gesturing, in addition to traditional touch and keyboard-based input modes. While a vast improvement over the options of the past, the same general framework persists where one modality is utilized at a time to control events.

As an example, many devices in the marketplace today support the voice invocation of digital assistants. Users can interact with digital assistants in a conversational manner by speaking a digital assistant's name followed by a command or request. In another example, spatial gestures made with a device (e.g. making a particular motion with a phone) can be used to unlock the device, control a video game, or the like.

The content capture experience has likewise been improved by the advent of new input modalities. Users can reliably generate content using the speech-to-text transcription capabilities of many applications and devices, as well as their handwriting recognition capabilities coupled with digital inking implements.

Nevertheless, the single-modality framework relegates the user to supplying input by one modality or another: a user is either speaking to a device or using touch or spatial gestures; typing on a keyboard or inking with a stylus. Such a framework limits the creative capacity of developers to continue to improve the user experience.

Some frameworks do utilize multiple modes of user input at the same time, but not to control events. For example, messaging applications include a feature whereby users can hold down a button while speaking, in order to make a recording of their voice which can be sent to a recipient in a text message. The first modality in this example is touch, while the second modality is voice, although it is the touch that controls events—the recording is just content.

OVERVIEW

Technology disclosed herein relates to a new multi-mode user input framework that enhances the user experience with respect to the content capture capabilities of computing devices and applications. In an implementation, a combined user input comprises a spoken utterance and a spatial gesture made at least partially coincident with the spoken utterance. An occurrence of the combined user input triggers the invocation of an associated content capture experience. Such an advance provides users with a new framework for interacting with their devices, applications, and surroundings.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Technology disclosed herein relates to systems, methods, and software that enhance the content capture experience by utilizing user input combined from spatial gestures and voice. The concept of a combined user input—such as a user gesturing with a phone coincident with vocalizing a statement about an action to take with the phone—allows users to interact more fluidly with their surroundings when, for example, taking pictures, recording video, or controlling remote services or devices. The technology disclosed herein may be implemented using computing hardware, software, or firmware, or any combination thereof, as well as machine learning, artificial neural networks, and other aspects of artificial intelligence.

In various implementations, one or more components of a computing device identify an occurrence of a combined user input such as a spoken utterance and a spatial gesture made with the device at least partially coincident with the spoken utterance. The one or more components identify a content capture experience associated with the combined user input and invoke the content capture experience on the device.

The combined user input may be detected or otherwise identified based on information produced by one or more sensors on the device that detect the spatial gesture, as well as audio data or information produced by one or more audio input devices that receive the spoken utterance, voice signal, sound, or the like. The one or more components of the device may determine, from a mapping of possible combined user inputs to possible content capture experiences which one the possible content capture experiences corresponds to the combined user input. For example, each of the possible combined user inputs can comprise a unique combination of one or more spoken utterances combined with one or more spatial gestures such that a given combined user input maps to a specific content capture experience.

In some examples, the spoken utterance for the combined user input may indicate an intention to capture an image with a camera on the computing apparatus. Examples of the spatial gesture include an upward movement of the computing device to point its integrated camera at a scene. In such a scenario, the content capture experience may include a user interface to a camera application that controls the camera.

In other examples, the spoken utterance for the combined user input may indicate an intention to create an audio recording with the one or more audio input devices, while the spatial gesture comprises a tilting movement of the computing apparatus to position the one or more audio input devices near a source for the audio recording. The content capture experience triggered by such a combined user input may include a user interface for interacting with the audio recording.

Figure 1:
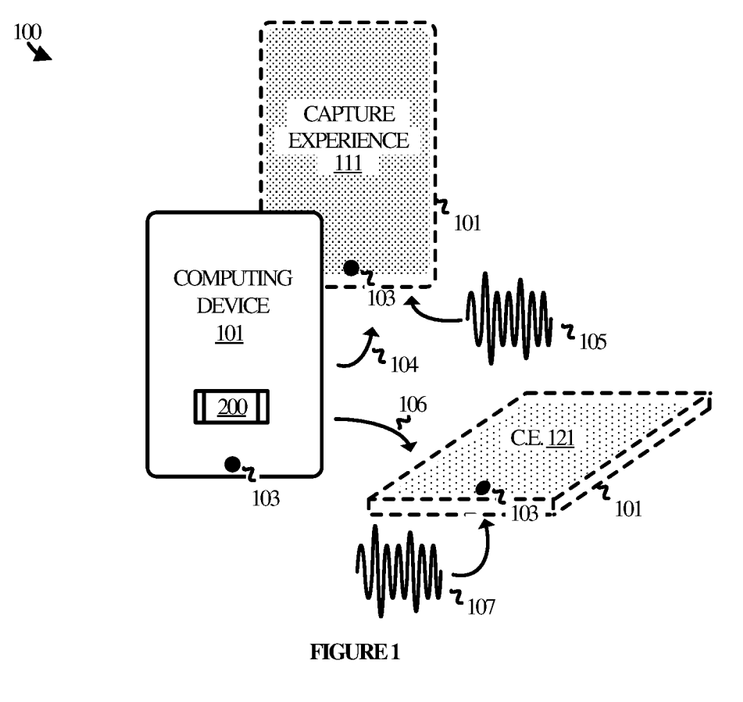
FIG. 1 illustrates an operational environment in an implementation.
Figure 2:
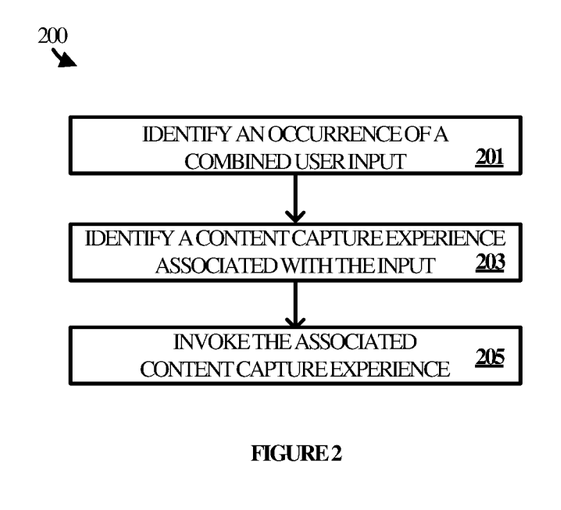
FIG. 2 illustrates an invocation process in an implementation.

Referring now to the drawings, operational environment 100 in FIG. 1 includes computing device 101, which employs invocation process 200 to provide all or portions of capture experience 111 and capture experience 121. Computing device 101 includes a microphone 103 through which speech may be received as well as one or more sensors (not shown) capable of detecting kinetic motion of the device.

Figure 6:
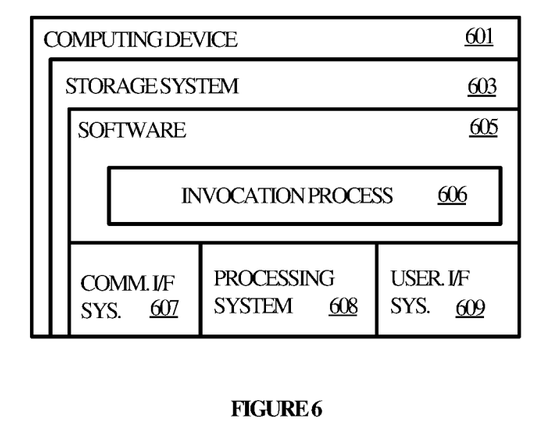
FIG. 6 illustrates a computing system suitable for implementing the various operational environments, architectures, processes, scenarios, and sequences discussed below with respect to the Figures.

A user can make a gesture with computing device 101 which, when combined with a voice signal, results in a combined user input that may be interpreted by hardware, software, or firmware, or any combination thereof, to drive one or more capture experiences on the device. Examples of computing device 101 include, but are not limited to, mobile phones, tablet devices, laptop computers, gaming devices, watches and other wearable devices, and any other suitable computing device, combination of devices, or variation thereof. Computing device 101 may be implemented in accordance with any suitable computing architecture of which the architecture of computing device 600 in FIG. 6 is representative.

Computing device 101 employs invocation process 200 to provide one or more of capture experience 111 and capture experience 121. Invocation process 200 may be implemented in the logic of program instructions and/or electronic circuitry in any of the modules, components or other such hardware, software, or firmware elements of computing device 101. Invocation process 200 directs the underlying physical (or virtual) computing components to operate as described as follows, referring parenthetically to the steps in FIG. 2.

In operation, invocation process 200 identifies an occurrence of a combined user input (step 201). For example, invocation process 200 monitors for two or more different types of user input to be received that overlap or coincide with each other for at least a moment. The amount of time or the duration for which the user inputs must overlap to be considered a combined user input can be configured based on user preferences, empirical results, or any other suitable metric. Examples of combined inputs include physical gestures with the device that occur coincident with voice input. Examples of physical gestures include, but are not limited to, lifting up a device, rotating a device, bringing a device closer to a user's voice, and setting down a device.

Next, invocation process 200 identifies a content capture experience associated with the combined input user (step 203). Different content capture experiences may be associated with different combinations of inputs. For instance, lifting up a device while speaking one utterance may result in a content capture experience that differs relative to lifting up the device while speaking a different utterance. Likewise, lifting up a device or speaking one utterance may result in a content capture experience that differs relative to rotating the device while speaking the same utterance. A variety of combinations of user input are possible, as are a variety of content capture experiences. Which combined inputs result in which content capture experiences may thus be a matter of design, user preferences, learned preferences, or the like.

Having identified the appropriate content capture experience, invocation process 200 proceeds to invoke the associated content capture experience (step 205). This may involve, for example, launching a particular application, executing a particular function, calling a particular component, or performing some other action or group of actions that result in the rendering or presentation of the corresponding content capture experience. As an example, lifting up a phone while simultaneously vocalizing a desire or intent to take a picture may result in the invocation of a camera application or function. In another example, tilting a device such that its microphone is brought closer to or is oriented in the direction of a user's voice may result in the transcription of the utterance into a comment, note, or other such memorial of what was spoken.

Referring back to FIG. 1, two brief examples are given with respect to operational environment 100. In the first example, a user makes an upward lifting gesture 104 with computing device 101. At the same time, the user expresses a vocal utterance 105 which is received by computing device 101 through microphone 103. Computing device 101, employing invocation process 200, recognizes the combined input of the gesture and the utterance and identifies its associated content capture experience. The corresponding content capture experience is thus rendered, presented, or otherwise provided through the user interface of computing device 101.

In the second example, the user makes a different gesture 106 with computing device 101. For instance, the user may rotate computing device 101 such that its microphone 103 is brought closer to the source of an utterance 107 that is coincident with the motion. Computing device 101, still employing invocation process 200, detects the combined user input and identifies its corresponding content capture experience, of which capture experience 121 is representative. Thus, the combined user input illustrated in the second example differs from the combined user input in the first example. The content capture experiences therefore also differ as illustrated by their different shading.

Figure 3:
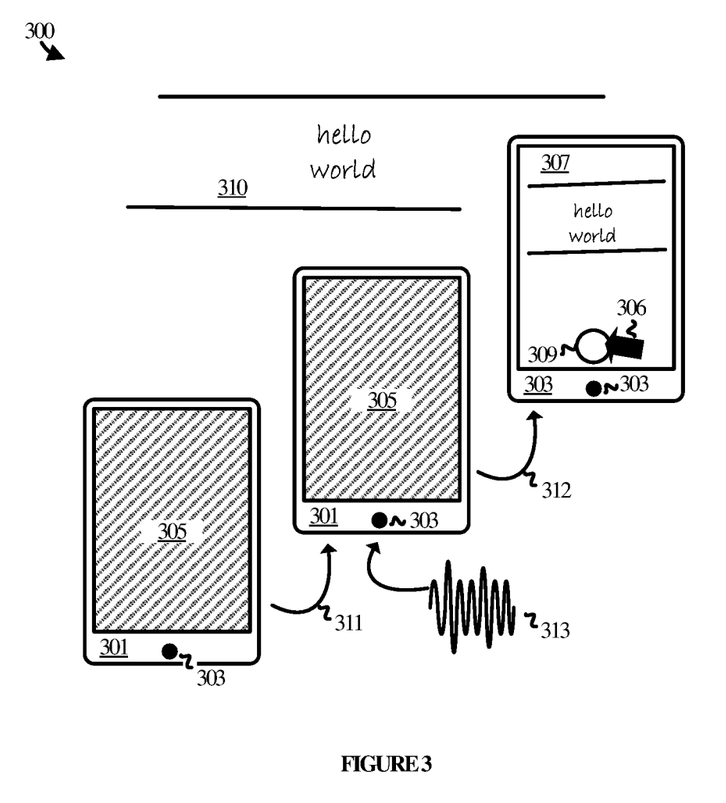
FIG. 3 illustrates an operational scenario in an implementation.

FIG. 3 illustrates an operational scenario 300 in one particular implementation of invocation process 200. Operational scenario 300 involves computing device 301 and whiteboard 310, although any scene is possible. Computing device 301 is representative of any suitable computing device such as mobile phones, tablets, laptops, gaming devices, embedded devices, wearable devices, and the like. Computing device 301 includes at least one microphone and a display 304 on which a content capture experience maybe presented. Content experience 305, which is displayed initially, may be representative of a lock screen, a page of a particular application, the home screen, or any other content experience.

The user holding or otherwise engaged with computing device 301 makes an upward lifting gesture 311 with computing device 301. At the same time, or at least for a period of time that overlaps with at least a portion of gesture 311, the user also produces a voice signal 313 which is received through microphone 303. Computing device 301 detects the occurrence of the combined user input and responsively launches a camera application that corresponds to the combined input. Thus, display 304 changes from displaying content experience 305 to displaying content experience 307. Content experience 307 includes a view of the scene viewable through the lens of the camera. In this example, the scene is of whiteboard 310 with the words "hello world"

scrawled on the whiteboard. Content experience 307 also includes a camera button 309 that when touched, depressed, or otherwise invoked by the user via user input 306 results in the capture of an image of the whiteboard or any other scene before the lens.

One or more technical effects may be appreciated from operational scenario 300 and the present disclosure in general. For instance, a user, by virtue of providing a combination of user inputs to computing device 301 is able to automatically trigger the transition from one content experience to another—or from a null experience (e.g. a lock screen) directly into a content experience. In this particular scenario, the content experience includes an automatic transition from a lock screen to the user interface screen for a camera application. The user is able to call up the camera application simply by lifting the device upward in a motion—is-if the user were about to take a picture—while also speaking a word, phrase, or other such utterance related to the act of taking a picture. Voice signal 313 therefore carries the utterance in a naturally encoded form which can be decoded and understood to be indicative of user intent to capture a photo, video, or other such representation of a scene.

Figure 4:
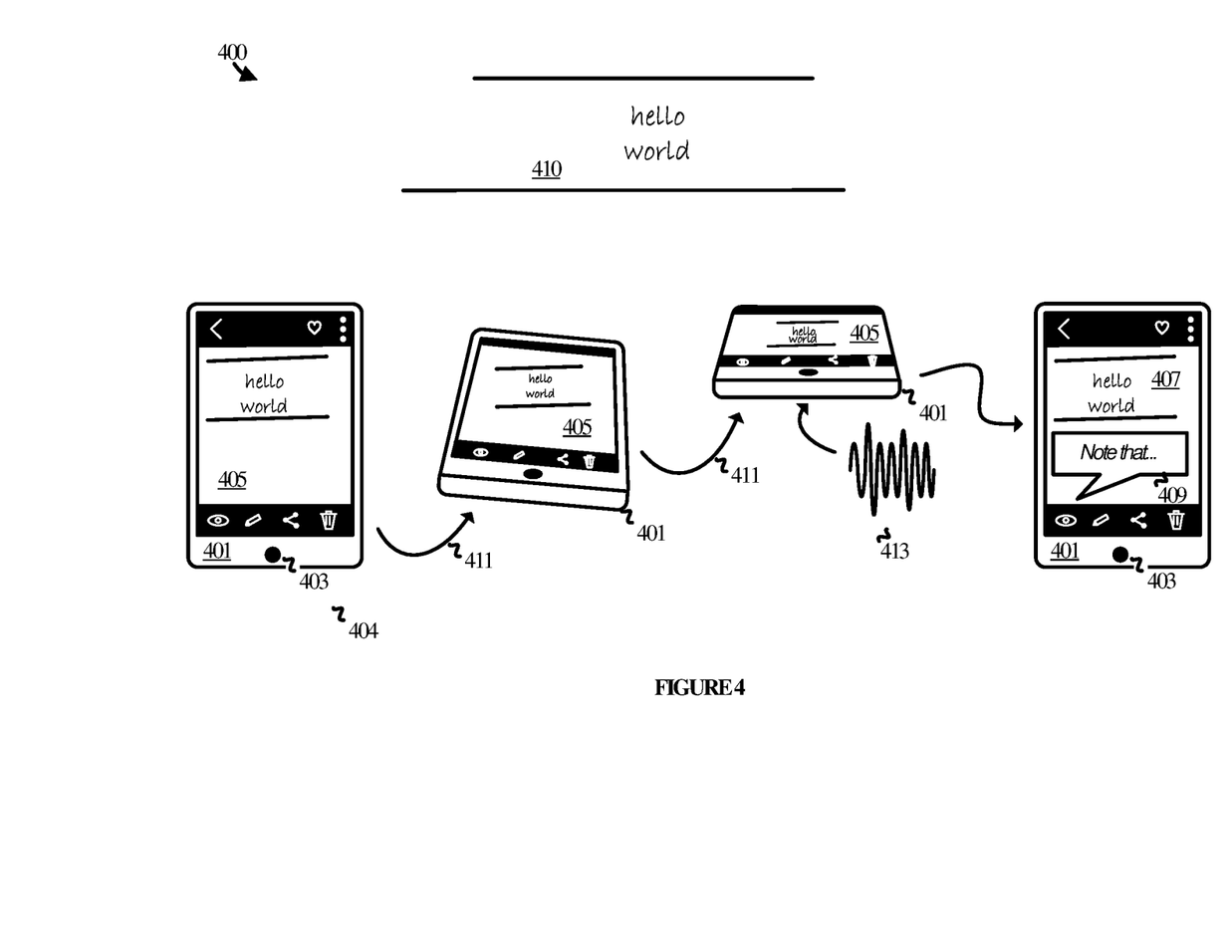
FIG. 4 illustrates an operational scenario in an implementation.

FIG. 4 illustrates operational scenario 400 in another example. Operational scenario 400 includes computing device 401 and white board 410. Computing device 401 includes a microphone 403 and a display on which a content experience 405 is displayed. Content experience 405 initially relates to an image viewable via a photo gallery application on computing device 401. Content experience 405 may be representative of the content experience a user encounters having just taken a photo such as the photo described in FIG. 3. Content experience 405 includes various controls for interacting with the photo such as an edit control, a share control, a delete control, and so on.

The user proceeds to make a gesture 411 to change the tilt or orientation of computing device 401. The rotational gesture continues through until the device is positioned substantially horizontally with the microphone positioned closer to the speaker's mouth. At about the same time, the user vocalizes an utterance encoded in voice signal 413. Voice signal 413 is captured via microphone 403. Computing device 401 detects the occurrence of the combined user input—which is the combination of gesture 411 with voice signal 413—and responds by transitioning content experience 405 to content experience 407. Content experience 407 is substantially the same as content experience 405 except that a transcription bubble 409 is included that provides a transcription of the utterance encoded in voice signal 413. For example, the user may be saying "Our homework assignment is to write a program that prints this to the screen."

Figure 5:
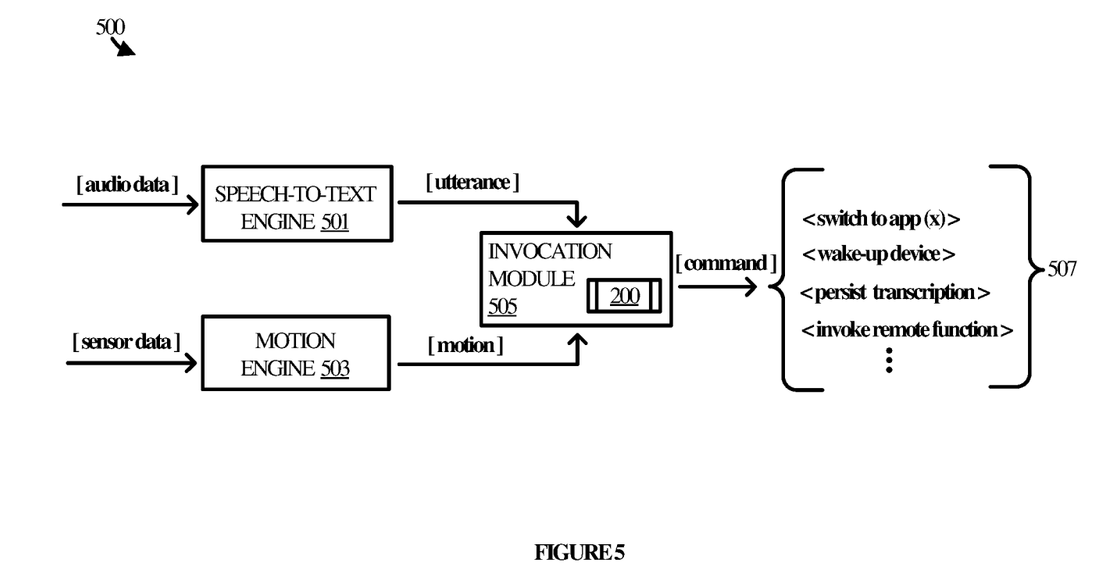
FIG. 5 illustrates an operational architecture for implementing combined inputs.

FIG. 5 illustrates operational architecture 500 in an implementation. Operational architecture 500 includes speech to text engine 501, motion engine 503, and invocation module 505. The components of operational architecture 500 may be implemented in hardware, software, and firmware, or any combination thereof.

Speech to text engine 501 receives audio data as input and provides a transcription of an utterance to invocation module 505. The audio data received by speech to text engine 501 may comprise a digital representation of an analog voice signal captured by a microphone. Speech to text engine 501 analyzes the audio data to convert the voice signal to a group of words that form the utterance. Speech to text engine 501 may receive the audio data directly from the one or more components open audio subsystem or from some other source. Speech to text engine 501 converts the audio data as it streams from its digital representation into a textual representation understood by invocation module 505.

Motion engine 503 receives sensor data from one or more sensor subsystems either directly or indirectly through an operating system component or utility. The sensor data may comprise for example acceleration information, dead reckoning information, or the like. Other examples of the sensor data include coordinate information, velocity information, decible information, angular information, or any other type of sensor data that allows motion engine 503 to ascertain the motion of a given device.

Invocation module 505 receives the utterances from speech to text engine 501 and the motion information from motion engine 503, and determines whether the inputs together form or otherwise represent a qualifying combined input. That is, at any given time a combined input may be received, but not all combined inputs will qualify as combined inputs that trigger a content experience. For instance, a user may lift up a device while speaking with a colleague irrespective of any desire to transition to a new content experience.

In order to differentiate between qualifying combined inputs and non-qualifying combined inputs, invocation module 505 analyzes the utterances to determine whether a given utterance corresponds to or is indicative of a qualifying utterance. Invocation module 505 may make such a determination based on a variety of factors such as the presence of one or more keywords within an utterance, one or more key phrases within the utterance, a surrounding context of the utterance, or any other factor. As an example, a user may speak the phrase "I will take a picture of it." Such an utterance includes the keyword "picture," which may qualify the utterance as one half of a qualifying combined input. In another example, a user may speak the phrase "Let me snap a pic of that," which could similarly be a qualifying utterance.

Invocation module 505 also analyzes the motion descriptions provided to it by motion engine 503 to determine whether a given motion represents a qualifying motion. As an example, motion engine 503 may indicate to invocation module 505 that the user has lifted a phone. Depending on the configuration of invocation module 505, the lift motion may qualify as one-half of a combined input. In a contrasting example, the sideways motion of a phone might not qualify as an input to be considered with respect to a combined input. However, in some scenarios, invocation module 505 may be configured such that a sideways motion does qualify. Invocation module 505 may be configured or otherwise tailored to the specifications of a given manufacturer, user preferences, the preferences of an application developer, or for any other suitable reason.

Invocation module 505 outputs one or more commands in response to the occurrence of a qualifying combined input. A particular combination of qualifying inputs will correspond to one or more commands that result in the invocation of corresponding content experiences. Commands 507 are representative of some of the actions that may be performed in response to a qualifying combined input. For instance, one combined input may trigger the device to switch to a specific application such as a camera application. In another example, a different combined input may trigger the device to wake up from a dormant mode. In still another example, the device may be triggered by a combined input to persist a transcription of an utterance to a file, object, or the like.

A given device may also be triggered by a combined input to invoke a remote function performed by one or more other devices separate and distinct and from the subject device. In a brief example, a particular combined input of a motion gesture that occurs simultaneously with a specific phrase in a spoken utterance may trigger the device to communicate remotely with a home information system (e.g. an entertainment subsystem, a heating and air conditioning subsystem, or any other in-home utility). The device may be capable of instructing the entertainment system to play music, for instance, or instructing the heating and air conditioning system to adjust the temperature in the home. In another example, a particular gesture made with the phone combined with the coincident utterance of a specific key phrase can cause the subject device to communicate with a security system remote from the device, an automobile system remote from the device, or even a cloud service remote from the device. A combined user input may also be used to trigger a device to communicate remotely with an emergency response authority. Device-to-device communications that are triggered by a qualifying combined user input are also possible.

FIG. 6 illustrates computing device 601 that is representative of any device or collection of devices in which the various processes, programs, services, and scenarios disclosed herein may be implemented. Examples of computing device 601 include, but are not limited to, mobile phones, tablets, laptops, desktops, watches and other wearable devices, and Internet of Things (IoT) devices. Some or all aspects of the various processes, programs, services, and scenarios disclosed herein may also be implemented on server computers, cloud computing platforms, and data center equipment, as well as any other type of physical or virtual server machine, container, and any variation or combination thereof.

Computing device 601 may be implemented as a single apparatus, system, or device or may be implemented in a distributed manner as multiple apparatuses, systems, or devices. Computing device 601 includes, but is not limited to, processing system 608, storage system 603, software 605, communication interface system 607, and user interface system 609. Processing system 608 is operatively coupled with storage system 603, communication interface system 607, and user interface system 609.

Processing system 608 loads and executes software 605 from storage system 603. Software 605 includes and implements invocation process 606, which is representative of the invocation processes discussed with respect to the preceding Figures. When executed by processing system 608 to enhance the user experience with respect to content capture experiences, software 605 directs processing system 608 to operate as described herein for at least the various processes, operational scenarios, and sequences discussed in the foregoing implementations. Computing device 601 may optionally include additional devices, features, or functionality not discussed for purposes of brevity.

Referring still to FIG. 6, processing system 608 may comprise a micro-processor and other circuitry that retrieves and executes software 605 from storage system 603. Processing system 608 may be implemented within a single processing device but may also be distributed across multiple processing devices or sub-systems that cooperate in executing program instructions. Examples of processing system 608 include general purpose central processing units, graphical processing units, application specific processors, and logic devices, as well as any other type of processing device, combinations, or variations thereof.

Storage system 603 may comprise any computer readable storage media readable by processing system 608 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device but may also be implemented across multiple storage devices or sub-systems co-located or distributed relative to each other. Storage system 603 may comprise additional elements, such as a controller, capable of communicating with processing system 608 or possibly other systems.

Software 605 (including invocation process 606) may be implemented in program instructions and among other functions may, when executed by processing system 608, direct processing system 608 to operate as described with respect to the various operational scenarios, sequences, and processes illustrated herein. For example, software 605 may include program instructions for implementing an invocation process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtualization software, or other application software. Software 605 may also comprise firmware or some other form of machine-readable processing instructions executable by processing system 608.

In general, software 605 may, when loaded into processing system 608 and executed, transform a suitable apparatus, system, or device (of which computing device 601 is representative) overall from a general-purpose computing system into a special-purpose computing system customized to provide enhanced content capture capabilities. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

User interface system 609 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, a conversational user interface, or any other type of user interface.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:
   one or more computer readable storage media;
   one or more processors operatively coupled with the one or more computer readable storage media; and
   program instructions stored on the one or more computer readable storage media that, when executed by the one or more processors, direct the computing apparatus to at least:
   identify an occurrence of a combined user input, wherein the combined user input comprises a spoken utterance and a spatial gesture made with the computing apparatus, at least partially coincident with the spoken utterance, wherein the spatial gesture comprises motion of the computing apparatus;
   identify a content capture experience associated with the combined user input; and
   invoke the content capture experience on the computing apparatus.

2. The computing apparatus of claim 1 further comprising:
   one or more sensors that detect the spatial gesture; and
   one or more audio input devices that receive the spoken utterance.

3. The computing apparatus of claim 2 wherein, to identify the content capture experience associated with the combined user input, the program instructions direct the computing apparatus to determine, from a mapping of possible combined user inputs to possible content capture experiences, which one the possible content capture experiences corresponds to the combined user input.

4. The computing apparatus of claim 3 wherein each of the possible combined user inputs comprises a unique combination of one or more spoken utterances combined with one or more spatial gestures.

5. The computing apparatus of claim 4 wherein each one of the possible combined user inputs maps to one of the possible content capture experiences.

6. The computing apparatus of claim 5 wherein:
   the spoken utterance for the combined user input indicates an intention to capture an image with a camera on the computing apparatus;
   the spatial gesture comprises an upward movement of the computing apparatus to point the camera at a scene; and
   the content capture experience comprises a user interface to a camera application that controls the camera.

7. The computing apparatus of claim 5 wherein:
   the spoken utterance for the combined user input indicates an intention to create an audio recording with the one or more audio input devices;
   the spatial gesture comprises a tilting movement of the computing apparatus to position the one or more audio input devices near a source for the audio recording; and
   the content capture experience comprises a user interface for interacting with the audio recording.

8. A method comprising:
- identifying an occurrence of a combined user input in a computing apparatus, wherein the combined user input comprises a spoken utterance and a spatial gesture made with the computing apparatus, at least partially coincident with the spoken utterance, wherein the spatial gesture comprises motion of the computing apparatus;
- identifying a content capture experience associated with the combined user input; and
- invoking the content capture experience on the computing apparatus.

9. The method of claim 8 further comprising:
- using one or more sensors of the computing apparatus to detect the spatial gesture; and
- using one or more audio input devices of the computing apparatus to receive the spoken utterance.

10. The method of claim 9 wherein identifying the content capture experience associated with the combined user input comprises determining, from a mapping of possible combined user inputs to possible content capture experiences, which one the possible content capture experiences corresponds to the combined user input.

11. The method of claim 10 wherein each of the possible combined user inputs comprises a unique combination of one or more spoken utterances combined with one or more spatial gestures.

12. The method of claim 11 wherein each one of the possible combined user inputs maps to one of the possible content capture experiences.

13. The method of claim 12 wherein:
- the spoken utterance for the combined user input indicates an intention to capture an image with a camera on the computing apparatus;
- the spatial gesture comprises an upward movement of the computing apparatus to point the camera at a scene; and
- the content capture experience comprises a user interface to a camera application that controls the camera.

14. The method of claim 13 wherein:
- the spoken utterance for the combined user input indicates an intention to create an audio recording with the one or more audio input devices;
- the spatial gesture comprises a tilting movement of the computing apparatus to position the one or more audio input devices near a source for the audio recording; and
- the content capture experience comprises a user interface for interacting with the audio recording.

15. One or more non-transitory, computer readable storage media having program instructions stored thereon that, when executed by one or more processors of a computing apparatus, direct the computing apparatus to at least:
- identify an occurrence of a combined user input, wherein the combined user input comprises a spoken utterance and a spatial gesture made with the computing apparatus, at least partially coincident with the spoken utterance, wherein the spatial gesture comprises motion of the computing apparatus;
- identify a content capture experience associated with the combined user input; and
- invoke the content capture experience on the computing apparatus.

16. The one or more non-transitory, computer readable storage media of claim 15 wherein, to identify the content capture experience associated with the combined user input, the program instructions direct the computing apparatus to determine, from a mapping of possible combined user inputs to possible content capture experiences, which one the possible content capture experiences corresponds to the combined user input.

17. The one or more non-transitory, computer readable storage media of claim 16 wherein each of the possible combined user inputs comprises a unique combination of one or more spoken utterances combined with one or more spatial gestures.

18. The one or more non-transitory, computer readable storage media of claim 17 wherein each one of the possible combined user inputs maps to one of the possible content capture experiences.

19. The one or more non-transitory, computer readable storage media of claim 18 wherein:
- the spoken utterance for the combined user input indicates an intention to capture an image with a camera on the computing apparatus;
- the spatial gesture comprises an upward movement of the computing apparatus to point the camera at a scene; and
- the content capture experience comprises a user interface to a camera application that controls the camera.

20. The one or more non-transitory, computer readable storage media of claim 18 wherein:
- the spoken utterance for the combined user input indicates an intention to create an audio recording with one or more audio input devices;
- the spatial gesture comprises a tilting movement of the computing apparatus to position the one or more audio input devices near a source for the audio recording; and
- the content capture experience comprises a user interface for interacting with the audio recording.

* * * * *